Jan. 1, 1946.  F. E. PAYNE  2,392,182
PISTON CONSTRUCTION
Filed June 19, 1943
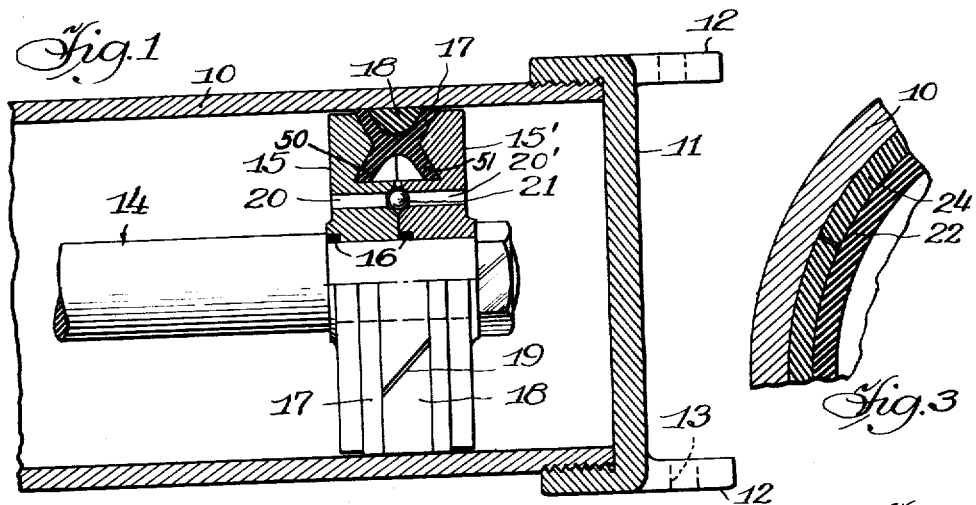
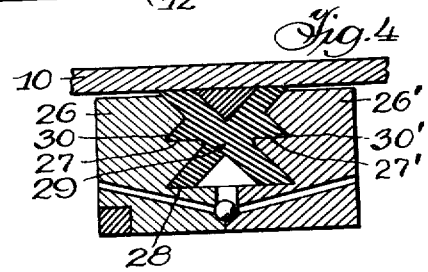
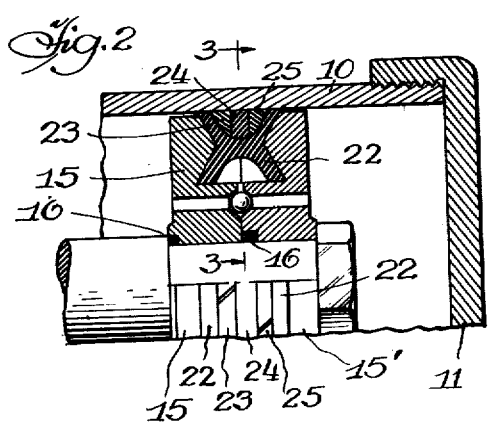
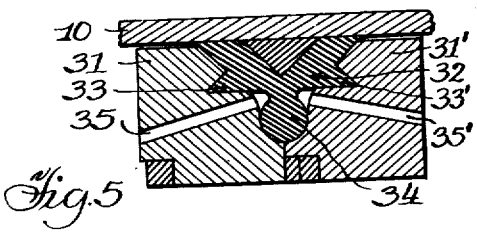
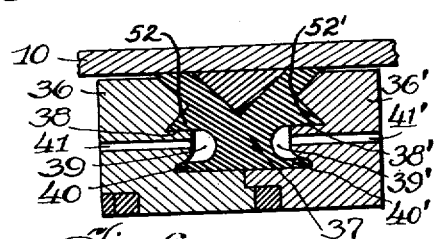
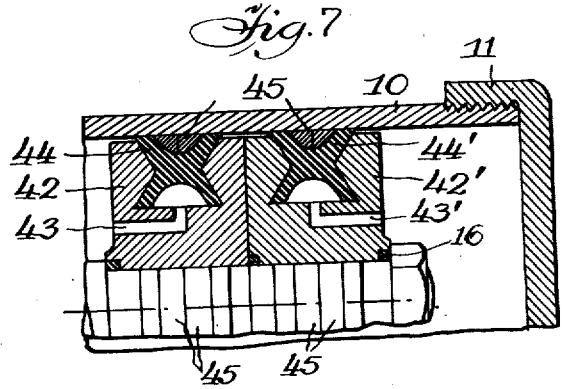
INVENTOR.
Frank E. Payne,
BY Chritton, Wiles, Davies
Schroeder & Merriam
Attys Patented Jan. 1, 1946

2,392,182

UNITED STATES PATENT OFFICE 2,392,182

PISTON CONSTRUCTION

Frank E. Payne, Glencoe, Ill., assignor to Crane Packing Company, Chicago, Ill., a corporation of Illinois Application June 19, 1943, Serial No. 491,526

17 Claims. (Cl. 309—32)

My invention relates to improvements in piston construction.

Difficulty has been experienced heretofore in preventing leakage of fluid pressure around pistons sliding in cylinders. Various kinds of sealing rings have been employed for the purpose, as, for example, rubber or other compressible rings which have been mounted in an annular groove in the piston and exert outward pressure against the cylinder wall. In some cases the fluid pressure works its way under the sealing rings and leaks past them. In others, the pressure exerted alternately against opposite sides of that part of the ring which projects slightly beyond the periphery of the piston, moves said rings back and forth in their seat, deforming the ring and causing uneven wear.

In addition to the objections arising under normal conditions of service, further difficulties are encountered when the equipment is subjected to wide variations in temperature. For example, some airplanes which are equipped with hydraulic systems are expected to operate in extremely cold climates. The cylinders and pistons are subjected to temperature variations between −65° F. and 160° F., and excessive leakage in parts of the system is said to be due to unsatisfactory packings, which shrink and also become harder and less compressible at lower temperatures.

The general object of my invention is to provide improved means for preventing leakage around pistons and particularly leakage under and around piston sealing rings, even under wide temperature variations.

Other objects are to provide piston rings of special design, the under sides of which are subjected to the same unit pressure as that applied to the side of the piston, which rings are capable of deforming or adjusting themselves to maintain an outward pressure on the cylinder wall, more or less in accordance with variations in the pressure in the cylinder itself and despite extreme cold and resultant shrinkage of the material; and also to maintain an effective seal when the material expands due to high temperatures. Another object is to so design the packing rings as to cause them to press radially inward against their seats.

Other objects and advantages will appear from the more detailed description hereinafter given.

In the accompanying drawing:

Fig. 1 is a section through a cylinder and a piston, the latter having a sealing ring illustrating one form of the invention;

Fig. 2 is a similar section of a modification;

Fig. 3 is a section on the line 3—3 of Fig. 2;

Figs. 4, 5 and 6 are sections of further modifications; and

Fig. 7 is a section illustrating a piston with a plurality of sealing rings.

Fig. 1 illustrates equipment which is typical of what is used on airplanes in which oil under pressure is used to operate some of the mechanism. The cylinder 10 has an end closure 11 in the form of a cap screwed in place. This cap may have projecting lugs 12 with apertures 13 therein to pivotally mount the structure. The piston rod 14 has a reduced end on which is mounted a piston made in two sections 15, 15', each section having an annular space to receive a gasket or packing ring 16 to prevent leakage between the piston and the piston rod. The piston is provided with an annular recess which, when viewed in section, flares inwardly and outwardly from an intermediate portion, as shown.

A packing ring 17 of suitable material is received within this recess, the outer walls being inclined to conform to the adjacent walls of the piston and the inner walls being likewise inclined. This ring may have an X section, i. e., two divergent inner and outer pairs of resilient arms, although the outer half may in some cases be made solid, if desired. The arms need not necessarily be of the same thickness. This ring may be made of rubber or of synthetic types of rubber, of which neoprene is an example. Most forms of rubber lose much of their resiliency and also shrink at low temperatures and particularly at temperatures as low as 65° below zero, and become hard. Certain special forms of artificial rubber have been developed recently which retain their characteristic properties, to a considerable extent, even at the low temperatures mentioned. The said packing ring 17 is made preferably of material capable of deformation even at low temperatures.

Where the packing ring has not only an inner annular groove between the diverging inner arms, as shown in Fig. 1, but has also an outer annular groove, the latter groove may have an additional sealing ring or rings fitted therein and made preferably of some anti-friction material, i. e., some material which will slide more readily along the inner surface of the cylinder than many of the forms of rubber heretofore mentioned. The ring 18 is an illustration of such anti-friction material and may be made of a phenol condensation product containing some other ingredients, as, for example, laminated material such as duck and the like, there being a number of such anti-friction materials available on the market. The outer diverging arms of the sealing rings bear against the adjacent inclined walls of the recess and also contact the inner wall of the cylinder to prevent leakage from one side of the piston to the other. The anti-friction ring 18 is formed preferably as an incomplete or split ring having beveled ends 19, and presses outwardly against the cylinder wall.

The annular space beneath said ring communicates by means of a duct or port 20 with one or both sides of the piston. When the communication is with both sides, a suitable valve such as the ball 21 is interposed to prevent the escape of the fluid pressure medium from one side of the piston to the other. Oil under pressure is the medium used in certain installations, although the packing is intended to seal against leakage of almost any liquid, gas or vapor. When pressure is applied to the left-hand side of the cylinder, for example, the ball is moved to the right against its seat, and the pressure against the inner part of the ring 17 presses the two diverging arms 50, 51 farther apart, increasing the sealing action against the walls of the recess in the piston. This tight engagement prevents the fluid pressure from working its way between the ring and the wall of the recess and around to the opposite side of the piston. The same pressure also tends to force the ring as a whole radially outward and thus increase the sealing pressure between the ends of the outwardly diverging arms and the cylinder wall. Said arms are also pressed more firmly against the adjacent piston wall, because of the wedge shape of ring 18. In addition, the anti-friction ring 18 is expanded outwardly against the inner wall of the cylinder. Thus leakage is prevented between the periphery of the piston and said cylinder wall. When the piston moves in the opposite direction the ball is moved to the left and the action of the fluid pressure on the sealing ring and on the anti-friction ring is the same.

If the equipment is subjected to very low temperatures and the sealing ring shrinks to an extent that ordinarily would permit leakage, the application of pressure to one side or the other of the piston results indirectly in pressing said ring outwardly and restores the sealing engagement previously described, so that even if the material of the ring becomes substantially harder and less compressible, an effective seal may be maintained nevertheless. The diverging inner arms of the X-shaped packing may be made thinner than the outer arms in some cases, if desired. Where special materials are employed which are capable of withstanding low temperatures without much shrinkage, the seal is maintained of course under these circumstances also. Where the anti-friction ring 18 is omitted and the outer part of the sealing ring is solid, its entire outer surface is pressed against the wall of the cylinder to prevent leakage.

Under some conditions it is preferable to use a plurality of anti-friction rings instead of a single ring. Such a modification is shown in Fig. 2, in which the sealing ring 22 of X cross-section may be much the same as in the first case described, and in which the outer groove in said sealing ring receives three anti-friction rings 23, 24 and 25. These are split rings arranged preferably in staggered relation, so that the joints occur at different points circumferentially. A sectional view of this Fig. 2 modification is shown in Fig. 3, in which the joint in the middle ring 24 is shown.

It will be understood that the sealing ring may be made of material other than the artificial rubber previously mentioned. Experience has shown that leather may be used satisfactorily in cold weather for sealing purposes, although it is not as desirable under high temperature conditions. A combination of rings of leather and of synthetic rubber and Bakelite may be used where the same apparatus may be subjected to high and low temperatures at different times. Various other combinations of sealing material and of anti-friction material may be employed in any of the various forms of the invention illustrated herein.

In Fig. 4 the piston ring is made in two parts 26, 26', as before, but has a plurality of undercut grooves providing seats 27 and 28 which, as shown in cross-section, are horizontal. The packing ring 29 is, in general, X-shaped, but has additional oppositely extending flanges 30 of triangular cross-section which rest on the seats 27, 27'. The ports and the ball valve are substantially as shown in the preceding figures, insofar as the operation is concerned.

When fluid pressure is admitted beneath the packing ring, it presses the same outwardly as before, there being an additional sealing action between the triangular ribs 30, 30' and the adjacent wall of the piston. Where the fluid pressure leaks through the clearance space between the piston and the cylinder wall and tends to leak inwardly between the packing 29 and the piston, there is an additional downward pressure of the triangular ribs 30, 30' against the seats 27, 27'.

In Fig. 5 the two halves of the piston 31, 31' are also undercut, somewhat after the manner shown in Fig. 4, and in addition a groove of circular cross-section is provided. The packing ring 32 has triangular extensions or ribs 33 and also an inner rib 34 of more or less circular section. The ports 35, 35' admit fluid pressure which not only presses the ring as a whole outwardly, as previously explained, but it presses against opposite sides of the ring and thus tends to expand it not only outwardly but radially inwardly. As a result, the rib 34 is pressed inwardly into closer sealing engagement with the recess in which it is mounted. The effect of these pressure components acting in different directions is to provide a more effective seal against leakage of fluid pressure between the sealing ring and the walls of the piston. It will be understood that, in this instance as well as in the previous form of invention, one or more sealing rings of hard anti-friction material may be employed in addition to the compressible sealing ring.

In Fig. 6 the two halves of the piston 36, 36' are also undercut somewhat, as shown in Figs. 4 and 5, and the inner part of the recess is also undercut to receive the sealing ring 37, which conforms in general to the shape of the recess. The triangular ribs 52, 52' press downwardly against the seats 38, 38', as previously explained. Also, a clearance space 39, 39' is provided on opposite sides of the packing ring, with the result that the oppositely extending ribs or fins 40, 40' are pressed downwardly against the bottom of the annular groove by fluid pressure admitted through the ports 41, 41'.

In Fig. 7 the piston 42, 42' is likewise of two-part construction, the sections having individual ports 43, 43' facing in opposite directions, which obviates the necessity of a valve. The sealing rings 44, 44' may be made of any of the materials previously mentioned, preferably those capable of withstanding extreme cold, as in the case of all of the others, and may be surrounded by a single anti-friction ring 45 or by a plurality of anti-friction rings.

Changes in the construction and arrangement may be made without departing from the spirit and scope of the invention as defined in the appended claims.

I claim:

1. A piston assembly comprising a cylinder, a piston rod, and a piston thereon, said piston having an annular recess which in section flares inwardly and outwardly from an intermediate portion, a ring of readily deformable material having an inner and an outer portion flared to engage the walls of said recesses in interlocking relationship, said ring engaging the wall of said cylinder to form a seal when said piston reciprocates, and having an annular groove in its under surface, and a port extending from one wall of said piston to said annular recess to admit fluid pressure to said groove and force said deformable material outwardly to increase the effectiveness of said seal and to prevent leakage between said ring and said piston.

2. A piston assembly comprising a cylinder, a piston rod and a piston thereon, said piston having an annular recess the inner portion of which is undercut, a sealing ring of flexible material fitted within said undercut recess to lock it in place, the outer portion thereof directly engaging the cylinder wall, a port extending from one wall of said piston to said annular recess to admit fluid pressure beneath said sealing ring and force the same into more intimate sealing engagement with said cylinder wall.

3. In a cylinder and piston assembly, a cylinder having a piston rod, a piston thereon, said piston having a groove in its outer surface, an expansible ring in said groove the inner surface of which ring is spaced from said piston to provide a clearance, the outer surface of said ring having also a groove therein, a plurality of split rings of anti-friction material mounted in said groove and engaging the cylinder wall, a duct leading from said clearance space beneath said ring to both sides of said piston to admit fluid pressure and force said expansible ring outwardly and increase the pressure of said anti-friction rings against the cylinder wall, and means in said duct for controlling the fluid pressure admitted from one side or the other of said piston.

4. An assembly comprising a cylinder, a piston therein and a piston rod connected thereto, said piston having an annular recess with a contracted intermediate portion, an X-shaped packing ring in said recess, and a port communicating with the clearance space beneath said packing ring and with one side of said piston to admit pressure tending to force said ring outwardly to increase the sealing engagement.

5. An assembly as in claim 4, in which auxiliary anti-friction sealing rings surround said X-shaped ring.

6. The combination with a sealing ring of X section whereof one pair of arms diverges outwardly and the other pair of arms diverges inwardly, of a piston having an annular recess therein the side walls of which are inclined to conform to the sides of said ring, said piston having a port to admit fluid pressure into the space between the inwardly diverging arms of said ring in order to press the outwardly diverging arms of said ring against the cylinder wall and to press the inwardly diverging arms more firmly against the inclined walls of said recess to prevent leakage around said ring.

7. In combination, a sealing ring of X section providing a groove on the outside and inside of said ring, a piston having an annular recess therein the side walls of which are shaped to fit to the opposite sides of said ring, a ring of anti-friction material in said outside groove, said piston having a port to admit fluid pressure beneath said ring to press said anti-friction ring against the cylinder wall of said ring and to press the inclined walls more firmly against the inclined walls of said recess and prevent leakage around said ring.

8. The combination of claim 7 in which said sealing ring is composed of material which at normal temperatures is compressible and resilient but becomes harder and shrinks at temperatures below zero, and in which said anti-friction material has less dimensional changes under variations in temperature than the material of said sealing ring.

9. The combination with a sealing ring of X section, of a piston having an annular recess therein the side walls of which are inclined to conform to the sides of said ring, said piston having a port to admit fluid pressure beneath said ring and press the outer part thereof against the cylinder wall and to press the inner inclined arms more firmly against the inclined walls of said recess to prevent leakage around said ring, said outer inclined arms having lateral extensions thereon to augment the sealing action, said port communicating with both sides of said piston and having a ball valve therein.

10. An assembly comprising a cylinder, a two-part piston therein and a piston rod connected thereto, said piston having an annular recess with an outer flaring portion, a one piece endless packing ring in said recess having a pair of outer flanges received in said flaring portion, a split ring of anti-friction material received between said flanges, the peripheral margins of said flanges and the cylindrical outer surface of said split ring being in direct engagement with the cylinder wall, a port extending from a clearance space beneath said endless ring to one side of the piston to admit fluid pressure and force said ring outwardly to increase the pressure against said cylinder wall.

11. In a piston assembly, a piston having a peripheral recess with two undercut portions, a packing ring mounted in said recess and projecting beyond said periphery, said ring having two pairs of oppositely extending flanges received in said undercut portions and resting on the walls of said recess, and ports communicating with said recess between said pairs of flanges to admit fluid pressure from the sides of said piston and compress said ring laterally and expand it radially inwardly and outwardly and thus increase the sealing engagement.

12. In combination, a sealing ring of X section providing a groove on the outside and inside of said ring and having oppositely extending lateral ribs, a piston having an annular recess therein the side walls of which are undercut and inclined to conform to the sides of said ring, a ring of anti-friction material in said outside groove, said piston having a port to admit fluid pressure beneath said ring to press said anti-friction ring against the cylinder wall and to press said oppositely extending ribs more firmly against the walls of said recess and prevent leakage around said ring.

13. In combination, a sealing ring having flexible diverging outer arms, a ring of anti-friction material between said arms, an inner rib on said ring having a contracted portion, a piston having an annular groove shaped to conform to said rib and to said diverging arms, and ports extending from the opposite sides of said piston to said contracted portion.

14. A piston assembly comprising a cylinder, a piston rod, and a piston thereon, said piston having an annular recess which in section flares inwardly and outwardly from an intermediate portion, a ring of readily deformable material having an inner and an outer portion flared to engage the walls of said recesses, said ring having an outer annular recess and a ring of anti-friction material mounted in said recess, said anti-friction ring and the margin of said readily deformable ring jointly engaging the wall of said cylinder to form a seal when said piston reciprocates.

15. An assembly comprising a cylinder, a piston having an annular recess the outer portion of which is provided with outwardly diverging walls, a resilient sealing member disposed in said annular recess and having portions shaped to lie against said outwardly diverging walls and to abut the wall of said cylinder, said resilient sealing member having an annular recess therein adjacent the wall of said cylinder, a sealing ring disposed in said last mentioned recess and formed of a material having a lesser coefficient of friction with respect to the cylinder wall than said resilient sealing member, said sealing member being so shaped as to provide an annular pressure chamber interiorly of said sealing member, and a port to admit fluid pressure to said pressure chamber, whereby the pressure within said cylinder will cause said sealing ring to be urged against the wall of said cylinder and at least one of the diverging portions of said resilient sealing member to be urged against the wall of said cylinder.

16. A sealing means adapted to be disposed in the cylindrical surface of a piston for cooperation with a cylinder wall, comprising in combination, an anti-friction sealing ring, a second sealing means formed from a resilient sealing material which is arranged adjacent said sealing ring and in contact with both side edges thereof, to form resilient marginal sealing portions for said sealing ring, the edges of said marginal portions which are remote from said sealing ring being feathered, and a pressure chamber disposed beneath said sealing means, in order that at least one of said marginal sealing portions may be urged outwardly when fluid pressure is admitted to said pressure chamber.

17. As an article of manufacture, a packing ring for use as a seal between a piston and a piston ring, said packing ring comprising an endless band of compressible and deformable material having one pair of diverging ribs extending inwardly and forming a fluid chamber with the piston for the reception of fluid under pressure to deform and hold said ribs against the piston in fluid-like engagement, and another pair of ribs receiving the piston ring between them and forming a fluid-tight seal between the piston ring and packing ring.

FRANK E. PAYNE.

CERTIFICATE OF CORRECTION.

Patent No. 2,392,182.    January 1, 1946.

FRANK E. PAYNE.

It is hereby certified that error appears in the printed specification of the above numbered patent requiring correction as follows: Page 3, second column, line 11, claim 7, strike out "of said ring" and insert the same after "walls", line 12, same claim; and that the said Letters Patent should be read with this correction therein that the same may conform to the record of the case in the Patent Office.

Signed and sealed this 19th day of March, A. D. 1946.

(Seal)

Leslie Frazer
First Assistant Commissioner of Patents.

13. In combination, a sealing ring having flexible diverging outer arms, a ring of anti-friction material between said arms, an inner rib on said ring having a contracted portion, a piston having an annular groove shaped to conform to said rib and to said diverging arms, and ports extending from the opposite sides of said piston to said contracted portion.

14. A piston assembly comprising a cylinder, a piston rod, and a piston thereon, said piston having an annular recess which in section flares inwardly and outwardly from an intermediate portion, a ring of readily deformable material having an inner and an outer portion flared to engage the walls of said recesses, said ring having an outer annular recess and a ring of anti-friction material mounted in said recess, said anti-friction ring and the margin of said readily deformable ring jointly engaging the wall of said cylinder to form a seal when said piston reciprocates.

15. An assembly comprising a cylinder, a piston having an annular recess the outer portion of which is provided with outwardly diverging walls, a resilient sealing member disposed in said annular recess and having portions shaped to lie against said outwardly diverging walls and to abut the wall of said cylinder, said resilient sealing member having an annular recess therein adjacent the wall of said cylinder, a sealing ring disposed in said last mentioned recess and formed of a material having a lesser coefficient of friction with respect to the cylinder wall than said resilient sealing member, said sealing member being so shaped as to provide an annular pressure chamber interiorly of said sealing member, and a port to admit fluid pressure to said pressure chamber, whereby the pressure within said cylinder will cause said sealing ring to be urged against the wall of said cylinder and at least one of the diverging portions of said resilient sealing member to be urged against the wall of said cylinder.

16. A sealing means adapted to be disposed in the cylindrical surface of a piston for cooperation with a cylinder wall, comprising in combination, an anti-friction sealing ring, a second sealing means formed from a resilient sealing material which is arranged adjacent said sealing ring and in contact with both side edges thereof, to form resilient marginal sealing portions for said sealing ring, the edges of said marginal portions which are remote from said sealing ring being feathered, and a pressure chamber disposed beneath said sealing means, in order that at least one of said marginal sealing portions may be urged outwardly when fluid pressure is admitted to said pressure chamber.

17. As an article of manufacture, a packing ring for use as a seal between a piston and a piston ring, said packing ring comprising an endless band of compressible and deformable material having one pair of diverging ribs extending inwardly and forming a fluid chamber with the piston for the reception of fluid under pressure to deform and hold said ribs against the piston in fluid-like engagement, and another pair of ribs receiving the piston ring between them and forming a fluid-tight seal between the piston ring and packing ring.

FRANK E. PAYNE.

---

CERTIFICATE OF CORRECTION.

Patent No. 2,392,182.                               January 1, 1946.

FRANK E. PAYNE.

It is hereby certified that error appears in the printed specification of the above numbered patent requiring correction as follows: Page 3, second column, line 11, claim 7, strike out "of said ring" and insert the same after "walls", line 12, same claim; and that the said Letters Patent should be read with this correction therein that the same may conform to the record of the case in the Patent Office.

Signed and sealed this 19th day of March, A. D. 1946.

(Seal)
Leslie Frazer
First Assistant Commissioner of Patents.